United States Patent
Tian

(10) Patent No.: US 9,128,528 B2
(45) Date of Patent: Sep. 8, 2015

(54) IMAGE-BASED REAL-TIME GESTURE RECOGNITION

(75) Inventor: Dihong Tian, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 479 days.

(21) Appl. No.: 13/530,698

(22) Filed: Jun. 22, 2012

(65) Prior Publication Data

US 2013/0342636 A1 Dec. 26, 2013

(51) Int. Cl.
| H04N 7/14 | (2006.01) |
| --- | --- |
| G06F 3/01 | (2006.01) |
| G06K 9/00 | (2006.01) |
| G06T 7/20 | (2006.01) |
| H04N 7/12 | (2006.01) |

(52) U.S. Cl.
CPC ............ *G06F 3/017* (2013.01); *G06K 9/00355* (2013.01); *G06T 7/2066* (2013.01); *G06T 2207/20021* (2013.01); *G06T 2207/30196* (2013.01); *H04N 7/12* (2013.01)

(58) Field of Classification Search
CPC ............ H04N 7/14; H04N 7/15; H04N 7/16; H04N 7/17; H04N 7/18; H04N 5/30; H04N 5/335–5/3559; H04N 5/72; H04M 3/56; H04M 2203/50–2203/509; G06F 3/017; G06K 9/00355; G06T 2207/20021; G06T 2207/2066; G06T 2207/30196
USPC .................... 348/14.01–14.16; 370/259–271, 370/351–357; 709/201–207, 217–248
See application file for complete search history.

(56) References Cited

U.S. PATENT DOCUMENTS

| 5,491,523 | A | * | 2/1996 | Sato | 348/699 |
| --- | --- | --- | --- | --- | --- |
| 6,061,476 | A | * | 5/2000 | Nichani | 382/270 |
| 7,039,676 | B1 | * | 5/2006 | Day et al. | 709/204 |
| 7,916,944 | B2 | * | 3/2011 | Yang et al. | 382/173 |
| 7,983,450 | B2 | * | 7/2011 | Higgins | 382/103 |
| 8,615,108 | B1 | * | 12/2013 | Stoppa et al. | 382/103 |
| 2004/0017579 | A1 | * | 1/2004 | Lim | 358/1.9 |
| 2004/0042677 | A1 | * | 3/2004 | Lee | 382/254 |
| 2005/0013502 | A1 | * | 1/2005 | Lim | 382/254 |
| 2008/0240571 | A1 | | 10/2008 | Tian et al. | |

(Continued)

OTHER PUBLICATIONS

Bradski, et al., "Motion Segmentation and Pose Recognition with Motion History Gradients," Machine Vision and Applications, vol. 13:3, Jul. 2002.

(Continued)

*Primary Examiner* — Hemant Patel
(74) *Attorney, Agent, or Firm* — Edell, Shapiro & Finnan, LLC

(57) ABSTRACT

Techniques are provided for image-based real-time gesture recognition. Video data of a person is obtained. Pixels are classified in the video stream at a given time instance during a time period as a foreground or a background pixel. A data entry is generated comprising data indicating foreground history values for each of a plurality of time instances of the video stream and data indicating a time period value. When the classifying indicates that a first pixel is a foreground pixel, the data structure associated with the first pixel is evaluated to determine whether or not to update a foreground history value associated with the first pixel at the given time instance. A motion gradient vector is generated for the video stream based on the foreground history value associated with the first pixel and foreground history values associated with other pixels.

24 Claims, 6 Drawing Sheets

(56) References Cited

U.S. PATENT DOCUMENTS

| | | |
|---|---|---|
| 2009/0324023 A1 | 12/2009 | Tian et al. |
| 2010/0194679 A1* | 8/2010 | Wu et al. ............. 345/156 |
| 2010/0199231 A1* | 8/2010 | Markovic et al. ...... 715/863 |
| 2011/0052002 A1* | 3/2011 | Cobb et al. ........... 382/103 |
| 2011/0111798 A1* | 5/2011 | Jeon et al. ........... 455/556.1 |
| 2011/0156999 A1* | 6/2011 | Wu et al. ............. 345/156 |
| 2012/0070036 A1* | 3/2012 | Lee .................... 382/103 |
| 2012/0110516 A1* | 5/2012 | Tumanov .............. 715/863 |
| 2012/0200486 A1* | 8/2012 | Meinel et al. ......... 345/156 |
| 2012/0235903 A1* | 9/2012 | Im ..................... 345/158 |

OTHER PUBLICATIONS

Du, et al., "Vision based gesture recognition system with single camera," Proceedings of ICSP, vol. 2, pp. 1351-1357, 2000.

"Touch Screen User Interface," http://www.eyesight-tech.com, May 4, 2012.

"Motion Analysis and Object Tracking," http://opencv.itseez.com/modules/video/doc/ motion_analysis_and_object_tracking.html#updatemotionhistory, May 4, 2012.

* cited by examiner

IMAGE-BASED REAL-TIME GESTURE RECOGNITION

TECHNICAL FIELD

The present disclosure relates to gesture recognition in video conference networks.

BACKGROUND

Gesture recognition technology enables devices to detect human motions in order to initiate electronic commands without the use of other computer interface devices (mouse, keyboard, etc.). For example, gesture recognition has become increasingly important to initiate commands in video conference systems. However, many devices enabled with gesture technology are inadequately equipped to interpret human motions as gestures associated with electronic commands.

DESCRIPTION OF EXAMPLE EMBODIMENTS

Overview

Image-based real-time gesture recognition techniques are provided. Video data comprising a video stream of a person is obtained, e.g., a participant in a video conference. Pixels represented by the video data are classified in the video stream at a given time instance during a time period as one of a foreground pixel and a background pixel. A data entry is generated in a data structure corresponding to each pixel. The data structure comprises data indicating foreground history values for each of a plurality of time instances of the video stream and data indicating a time period value. When the classifying indicates that a first pixel of the video stream is a foreground pixel, the data structure associated with the first pixel is evaluated to determine whether or not to update the data representing a foreground history value associated with the first pixel at the given time instance. A motion gradient vector is generated for the video stream based on the foreground history value associated with the first pixel and foreground history values associated with other pixels over the time period.

Example Embodiments

Figure 1:
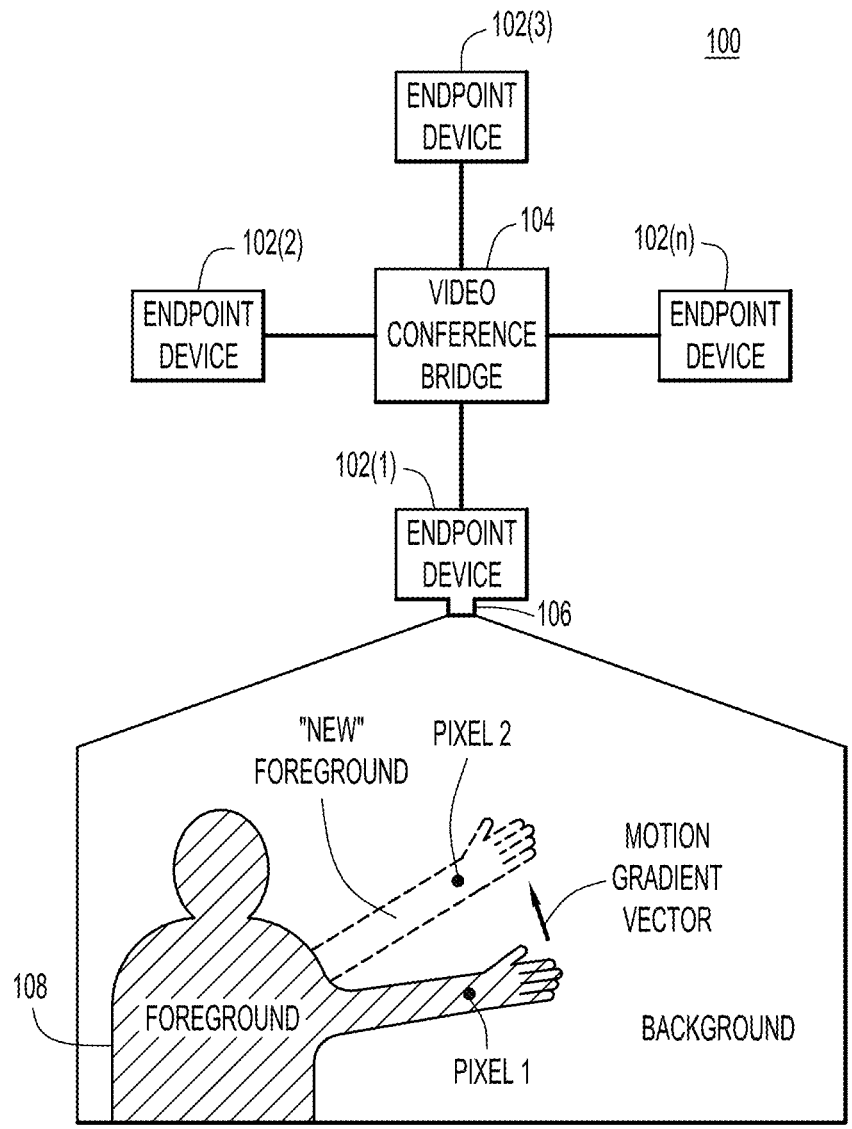
FIG. 1 shows an example block diagram of a video conference system depicting a plurality of endpoint devices and a video conference bridge device configured to detect gestures of a person at a video conference participant.

The techniques described hereinafter are directed to image-based real-time gesture recognition by evaluating pixels of a video stream to generate a motion gradient vector associated with user/participant movements. FIG. 1 shows an example video conference system 100. The system 100 comprises a plurality of endpoint devices ("endpoints") 102(1)-102(n), each of which is in communication with a video conference bridge device ("video conference bridge" or "bridge") 104. Each of the endpoint devices 102(1)-102(n) is configured to capture (e.g., record or stream) video (and audio) data of one or more respective participants. For example, as shown in FIG. 1, endpoint device 102(1) may have a camera unit 106 that is configured to capture video data of one or more video conference participants ("participants" or "users") at the endpoint. In FIG. 1, an example participant at endpoint device 102(1) is shown at reference numeral 108. It should be appreciated that any of the endpoint devices 102(1)-102(n) may be configured with a camera or other similar equipment to capture the video data.

As shown in FIG. 1, the participant 108 may make a motion or series of motions during a video conference. These motions may correspond to predetermined gestures that may be detectable by the endpoint device 102(1). For example, the participant 108 may perform a "hand raise" motion, and upon detecting the "hand raise" motion, the endpoint device 102(1) may interpret the motion as a corresponding predetermined or pre-programmed gesture. Once the endpoint device 102(1) interprets the motion as the predetermined gesture, the endpoint device 102(1) may execute a corresponding electronic operation associated with the gesture motion. As described by the techniques hereinafter, the endpoint device 102(1) may detect the movement by the participant 108 and may generate a motion vector associated with the movement. The motion vector may then be used to interpret the movement as corresponding to a predetermined gesture. The motion vector may be generated by analyzing pixels of the video data of the participant 108 over time. It should be appreciated that any of the endpoint devices 102(1)-102(n) or the video conference bridge device 104 may perform the motion and gesture detection techniques described herein.

Figure 2:
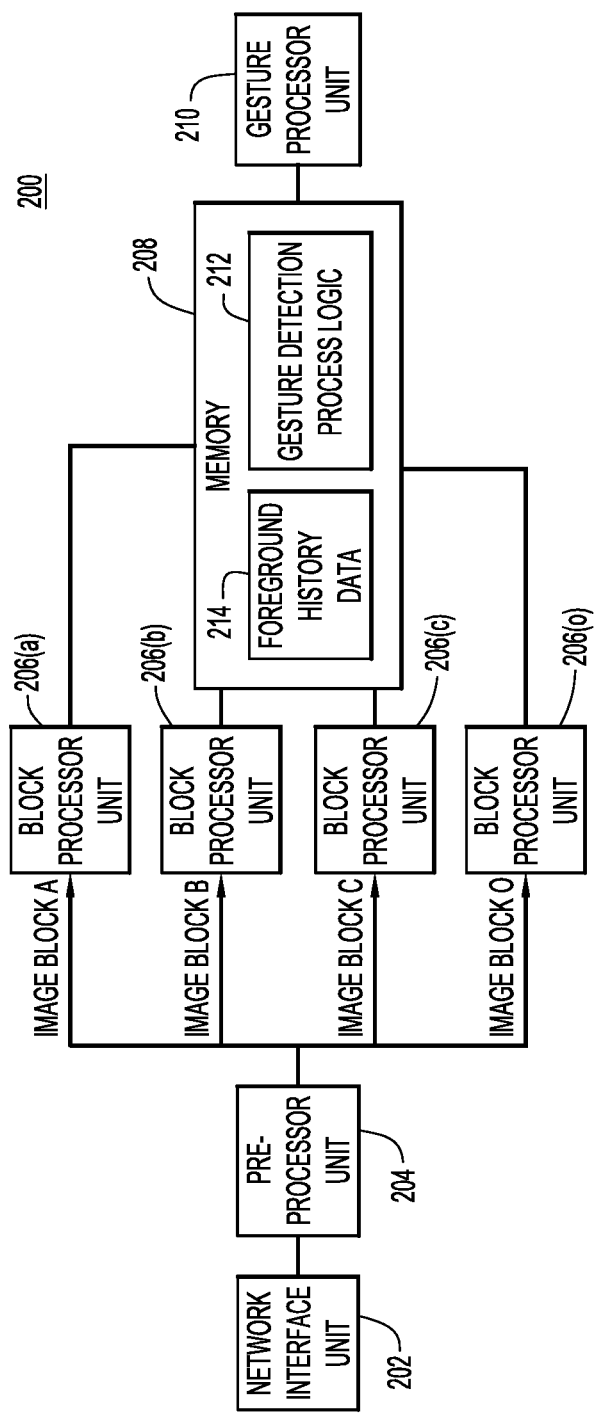
FIG. 2 shows an example block diagram of one of the endpoint devices or the video conference bridge device configured with gesture detection process logic to detect the gestures of a person at the video conference participant.

Reference is now made to FIG. 2. FIG. 2 shows an example block diagram 200 of one of the endpoint devices 102(1)-102(n) configured to perform the motion and gesture detection techniques described herein. The video conference bridge device 104 may also be similarly configured to perform these techniques. Thus, it should be appreciated that the block diagram 200 may represent any of the endpoint devices 102(1)-102(n), the video conference bridge device 104 or any other intermediate device in the video conference system 100 that is not shown in FIG. 1. For simplicity, the motion and gesture detection techniques are described hereinafter as being performed by the endpoint device 102(1), and the block diagram 200 is described for the endpoint device 102(1).

There are a network interface unit 202, a pre-processor unit 204, a plurality of block processor units 206(a)-206(o), a memory 208 and a gesture processor 210. The network interface unit 202 is configured to send and receive a video data stream ("video data" or "video stream") within the system 100. For example, when the block diagram 200 represents one of the endpoint devices 102(1)-102(n), the network interface unit 202 may receive video data from the camera unit 108 (not shown in FIG. 2) and may send the video stream to the video conference bridge 104. Likewise, when the block diagram 200 represents the video conference bridge 104, the network interface unit 202 may receive a video stream from one of the endpoint devices 102(1)-102(n) and may send the video stream to other endpoint devices 102(1)-102(n) in the system 100.

The network interface unit 202 is coupled to the pre-processor unit 204. The pre-processor unit 204 receives the video stream from the network interface unit 202 and divides or partitions the video stream into one or more video data stream regions. For example, video streams received from the network interface unit 202 may be partitioned into multiple video data regions (or "image blocks") each having a portion or subset of pixels of the video stream. FIG. 2 shows four image blocks (Image Block A, Image Block B, Image Block C and Image Block O), though it should be appreciated that the pre-processor unit 204 may divide the video data into any number of image blocks. The pre-processor unit 204 is also configured to crop (e.g., select regions of interest) or downscale the video data. The video data, for example, may be divided into multiple regions of interest, each containing, e.g., one participant, and the entire gesture recognition can be performed in parallel on all the regions of interest. As described herein, this allows for a high level of processing concurrence of the video data.

After the video stream is divided, each image block is sent from the pre-processor unit 204 to a corresponding one of the block processor units 206(a)-206(o). The collection of block processor units 206(a)-206(o) may be embodied by one or more microprocessors or microcontrollers that are configured to execute program logic instructions (i.e., software) for carrying out various operations and tasks described herein. For example, the block processor units 206(a)-206(o) are configured to execute the gesture detection process logic 212 that is stored in the memory 208 to evaluate pixels of an image block of the video stream and to detect a motion and gesture of a video conference participant. The functions of the block processor units 206(a)-206(o) may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 208 is accessible by the block processor units 206(a)-206(o) and may comprise read only memory (ROM), random access memory (RAM), magnetic disk storage media devices, optical storage media devices, flash memory devices, electrical, optical, or other physical/tangible (i.e., non-transitory) memory storage devices. The memory 208 stores software instructions for the gesture detection process logic 212. Additionally, the memory 208 stores foreground history data 214 which contains data indicating foreground history values for pixels in a video stream over a time period, as described herein. The foreground history values can be used to detect a participant's motion, generate a motion gradient vector associated with the participant's motion and ultimately classify the motion as one of a particular predetermined gesture, if appropriate, as described by the techniques hereinafter. In general, the memory 208 may comprise one or more computer readable storage media (e.g., a memory storage device) encoded with software comprising computer executable instructions and when the software is executed (e.g., by the block processor units 206(a)-206(o) or the gesture processor 210) it is operable to perform the operations described for the gesture detection process logic 212.

The gesture detection process logic 212 may take any of a variety of forms, so as to be encoded in one or more tangible computer readable memory media or storage device for execution, such as fixed logic or programmable logic (e.g., software/computer instructions executed by a processor), and the block processor units 206(a)-206(o) may be an application specific integrated circuit (ASIC) that comprises fixed digital logic, or a combination thereof. For example, the block processor units 206(a)-206(o) may be embodied by digital logic gates in a fixed or programmable digital logic integrated circuit, which digital logic gates are configured to perform the gesture detection process logic 212. In general, the gesture detection process logic 212 may be embodied in one or more computer readable storage media encoded with software comprising computer executable instructions and when the software is executed operable to perform the operations described hereinafter.

The gesture processor unit 210 is also configured to access the memory 208 in order to execute the gesture detection process logic 212. The gesture processor unit 210 may operate, for example, to detect motions and identify corresponding gesture associated with the motions and/or to execute electronic operations when motions are identified and gestures are detected by the block processor units 206(a)-206(o). Additionally, the gesture processor unit 210 may be a processor that operates in a similar manner as the block processor units 206(a)-206(o). It should be appreciated that though FIG. 2 shows the block processor units 206(a)-206(o) and the gesture processor unit 210 as separate processor devices, a single processor device may perform the functionality for the block processor units 206(a)-206(o) and the gesture processor unit 210. Additionally, the functionality of the gesture processor unit 210 may be present in each of the block processor units 206(a)-206(o). As stated above, the block processor units 206(a)-206(o) and the gesture processor unit 210 may be implemented as a single processor configured to before the processes described hereinafter.

In general, as stated above, the endpoint device 102(1) is equipped with the camera unit 106 that is configured to capture or record video data of the participant 108. The video data, for example, is a video stream of the participant 108 over a period of time. Motions performed by the participant 108 are captured by the camera unit 106 and are analyzed by the endpoint device 102(1) to determine whether or not the participant 108 intended to perform a predetermine gesture motion. That is, the endpoint device 102(1) may be configured to associate one or more gesture motions with corresponding electronic operations. In one example, an arm raising motion performed by the participant 108 may cause the endpoint device 102(1) to associate the arm raising motion with a "hand raise" gesture that is pre-programmed in the endpoint device 102(1) and that has a corresponding electronic command. The "hand raise" gesture, for example, may cause the endpoint point device 102(1) to broadcast the video data of the participant 108 to the other endpoint devices to allow the participant 108 to speak to other participants located at the other endpoint devices.

The endpoint device 102(1) is configured to detect motions of the participant 108 by evaluating pixels associated with the video stream captured by the camera unit 106. For example, the video stream may be a compilation of video images at a plurality of time instances. In other words, the video stream may be a compilation or aggregation of "snapshot" video images (i.e., image frames) at multiple time instances. Each of the video images comprises a plurality of pixels of image data captured by the camera unit 106 at each of the time instances. The endpoint device 102(1) may evaluate the pixels of each video image at each of the time instances to determine whether or not the participant 108 has performed a motion.

The endpoint device 102(1) evaluates the pixels to generate a motion gradient vector over a predetermined time period. The motion gradient vector identifies a motion or movement by the participant and perceived by the endpoint device 102(1) for portions of the video stream. The endpoint device 102(1) can then evaluate the motion gradient vector to determine whether or not the identified motion is intended to be a predetermined gesture initiated by the participant 108. If a gesture is intended, the endpoint device 102(1) can execute the electronic operation or command associated with the gesture. For example, the endpoint device 102(1) may assign a confidence score or value to identified motion that reflects a range of certainty of the endpoint device 102(1) that the motion was intended to be the predetermined gesture. If the confidence value is greater than a predetermined threshold, the endpoint device 102(1) may execute the electronic command associated with the predetermined gesture. If the confidence value is lower than the predetermined threshold, the endpoint device 102(1) may not execute the electronic command associated with the predetermined gesture (e.g., the endpoint device 102(1) will determine that the participant did not intend to perform a gesture). The endpoint device 102(1) may assign multiple confidence values for multiple corresponding gestures and may select the gesture with the highest confidence value as the intended gesture associated with the participant movement.

As stated above, the video stream may be divided into a plurality of image blocks. Each of the image blocks may comprise a portion of the video stream over each of the time instances of the duration of the video stream. For example, the video stream may be divided into four portions (analogous to a video image frame being divided into four portions), and the endpoint device 102(1) may evaluate pixels of video image frames in each of the four portions at each of the time instances. Dividing the video stream into multiple portions may be beneficial, since computations on pixel elements within the portions may require less processing intensive operations and resources by the endpoint device 102(1) or other network devices when compared to computations on pixel elements for the entire video stream image frames. Thus, an apparatus (e.g., the endpoint device 102(1)) consisting of a plurality of processors (e.g., the block processor units 206(a)-206(o)) can perform the gesture detection techniques described herein in a parallelized fashion with each block processor analyzing pixels in one of the image blocks. This allows gesture recognition to be achieved in real time or near-real time with minimal processing resources required. In one example, gesture recognition may be achieved at least at the same frame-processing rate as the video images are generated.

The endpoint device 102(1) evaluates pixels of the video images by classifying pixels at a given time instance during a time period as either a foreground pixel or a background pixel. A foreground pixel is defined as a pixel determined by the endpoint device 102(1) to be important for evaluation, while a background pixel is defined as a pixel determined by the endpoint device 102(1) to be unimportant for evaluation. For example, a foreground pixel may be a pixel that identifies a body part or body region location of the participant 108. For a particular pixel or group of pixels in a video image at a given time instance, the endpoint device 102(1) may determine whether or not the pixel or group of pixels has attributes that are identified as belonging to an image of the participant 108. If the pixel or group of pixels is identified as belonging to an image of the participant 108, the pixel or pixels are given a "foreground" classification. If the pixel or group of pixels is identified as not belonging to an image of the participant 108, the pixel or pixels are given a "background" classification. The endpoint device 102(1) may use existing temporal detection techniques, body region detection techniques together with pre-programmed heuristics (e.g., comprising relative or expected position of human body portions) or other existing techniques to classify the pixels as "foreground" or "background" pixels.

Figure 3:
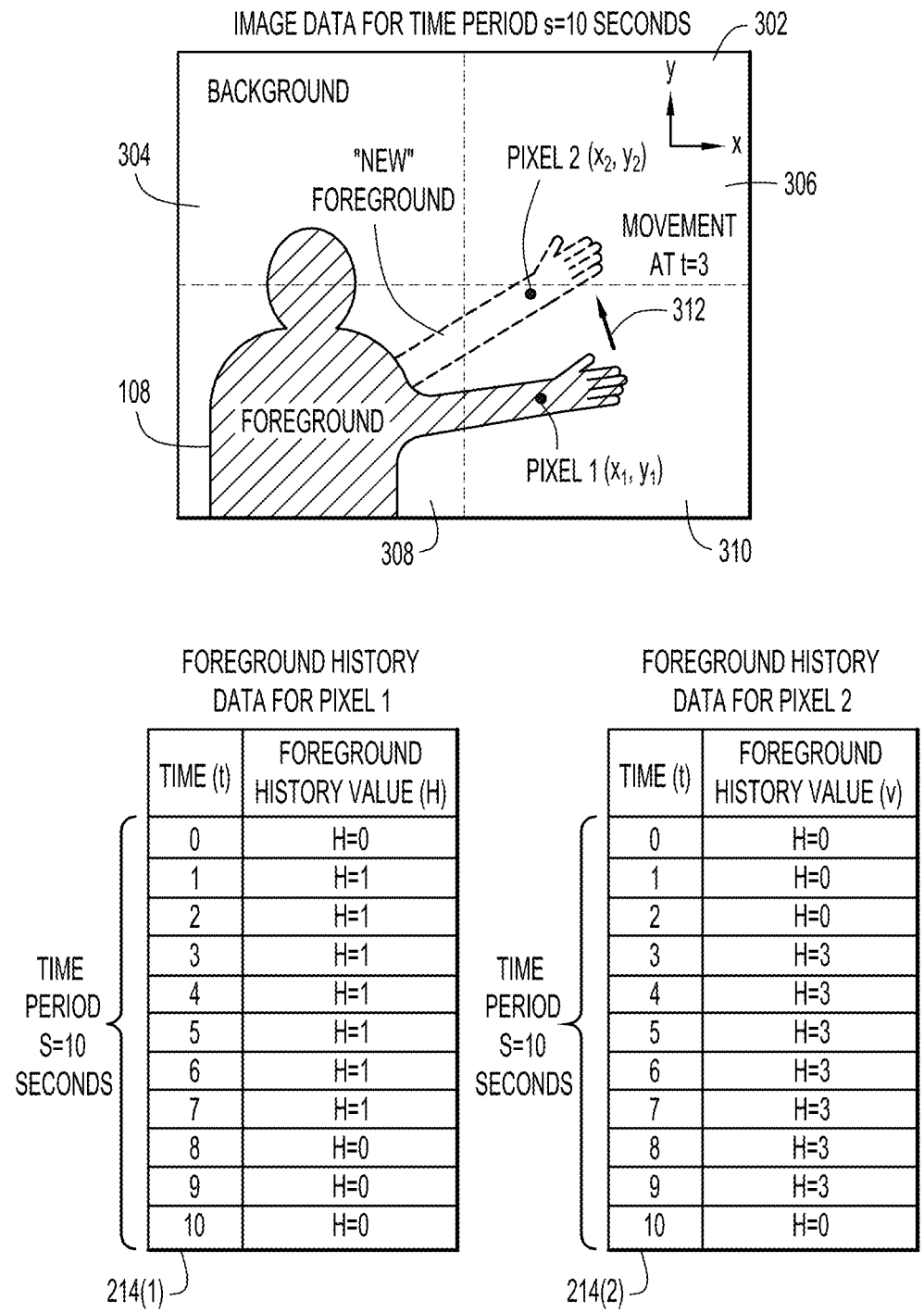
FIG. 3 shows an example of an intended gesture/movement instance and a foreground history data structure storing foreground history values for pixels at multiple time instances to generate a motion gradient vector.

Reference is now made to FIG. 3. FIG. 3 shows an example movement instance by the participant 108 and corresponding adjustments to the foreground history data of particular pixels in the video data. As stated above, the endpoint device 102(1) classifies the pixels of a plurality of video images at a plurality of time instances. For example, as shown in FIG. 3, for a time period "s" (e.g., ten seconds), the endpoint device 102(1) may classify the pixels of the video images at particular time instances "t" (e.g., every one second). Reference numeral 302 in FIG. 3 shows video data of the participant 108 over the time period "s" (ten seconds). At time t=3 seconds, the participant 108 performs an arm raising motion (e.g., raises his or her arm). The participant 108 may be intending to provoke an electronic operation associated with a "hand raise" gesture pre-programmed in the endpoint device 102(1), or the participant may inadvertently move his or her arm without intending to provoke the "hand raise" gesture operation. The endpoint device 102(1) evaluates the pixels of the video images to make this determination.

As shown, the video data 302 is divided into four image blocks, shown at reference numerals 304, 306, 308 and 310. The endpoint device 102(1) can perform the gesture detection techniques described herein concurrently on each of the image blocks. For example, the block processor units 206(a)-206(o) may perform the per-pixel processing operations (e.g., pixel classification, motion vector generation, etc.) and the gesture processor unit 210 may perform the gesture determination with received motion vectors. As stated above, each of the image blocks has a plurality of pixels for the video images over the time period "s." The endpoint device 102(1) classifies, at each time instance "t" over the time period "s," these pixels as "foreground" or "background" pixels. After this classification, the endpoint device 102(1) assigns each of the pixels with a foreground history value at each time instance "t" in the time period "s." The pixels are defined or identified by, for example, Cartesian coordinates within the video data 302.

FIG. 3 shows two example pixels: pixel 1 in image block 310 and pixel 2 in image block 306. Pixel 1 is located at coordinates $(x_1, y_1)$ and pixel 2 is located at coordinates $(x_2, y_2)$. The endpoint device 102(1) classifies these pixels as "foreground" or "background" pixels at each of the time instances "t" in the time period "s" (e.g., every second in a ten second time period). Additionally, the endpoint device 102(1) is configured with a foreground history time period value "n." The foreground history time period value is a value during which the endpoint device 102(1) recognizes a previous classification of a foreground pixel as valid. In other words, the foreground history time period prevents the endpoint device 102(1) from maintaining out-of-date or "stale" foreground pixel classifications. The endpoint device 102(1) reevaluates the foreground pixel classifications at the end of the foreground history time period, which may be less than the time period "s." In FIG. 3, the foreground history time period is assumed to be six seconds, and thus, the endpoint device 102(1) reevaluates a foreground pixel's classification every six seconds after the pixel is classified as a foreground pixel. It should be appreciated that the foreground history time period "n" may be any value. Additionally, it should be appreciated that the time period "s" and the time instances "t" may be also be any value. For simplicity, the foreground time history time period "n" is assumed herein to be six seconds, the time period "s" is assumed to be ten seconds and the time instances "t" are assumed to be time instances at one second increments.

In the example of FIG. 3, initially, at time t=1 second, the endpoint device 102(1) identifies pixel 1 as a pixel belonging to the participant 108 and classifies pixel 1 at t=1 as a foreground pixel. On the other hand, at t=1 second, the endpoint device 102(1) identifies pixel 2 as a pixel not belonging to the participant 108 and classifies pixel 2 at t=1 as a background pixel. The endpoint device 102(1) also assigns a corresponding foreground history value for each of the pixels at this time instance, as described herein.

As the participant 108 moves, the classification of pixel 1 and pixel 2 may change. In FIG. 3, the participant performs an arm raising motion at t=3 seconds. Thus, at time instance t=3, pixel 1 is no longer classified as a foreground pixel (since the participant's arm is no longer present in pixel 1's location) and likewise, pixel 2 is classified as a foreground pixel (since the participant's arm has moved into pixel 2's location).

The endpoint device 102(1) assigns foreground history values to the pixels at each of a plurality of time instances according to pre-programmed or predetermined logic. In one example, the following logic is used to assign foreground history values (H) for each of the pixels, though it should be appreciated that any foreground history value assignment logic may be used:

```
IF H(x,y,t-1) = 0 and (x,y) is FOREGROUND
    H(x,y,t) = t
ELSE IF H(x,y,t-1) < t - n
    H(x,y,t) = 0
ELSE
    H(x,y,t) = H(x,y,t-1)
END
``` where (x,y) represents a pixel location, t represents a time instance and n represents a foreground history time period.

This foreground history value assignment is shown for pixel 1 at reference numeral 214(1) and for pixel 2 at reference numeral 214(2). Reference numerals 214(1) and 214(2) represent data instances of the foreground data history 214, described above. As shown, initially, at t=1, the foreground history value (H) for pixel 1 is assigned as H=1, according to the foreground history value assignment logic above. The foreground history value for pixel 1 remains assigned as H=1 for the predetermined foreground history time period n (e.g., six seconds). Thus, the foreground history value for pixel 1 remains assigned as H=1 for time instances t=1 to t=7.

On the other hand, initially, the foreground history value (H) for pixel 2 is assigned as H=0, according to the foreground history value assignment logic above (e.g., since pixel 2 is not a foreground pixel). The foreground history value for pixel 2 remains assigned as H=0 until the endpoint device 102(1) classifies pixel 2 as a foreground pixel (e.g., at time t=3). Once pixel 2 is classified as a foreground pixel, the foreground history value for pixel 2 is assigned as H=3 (the time instance at which the pixel was classified as a foreground pixel). The foreground history value for pixel 2 remains assigned as H=3 for the predetermined foreground history time period (six seconds). Thus, the foreground history value for pixel 2 remains assigned as H=3 for time instances t=3 to t=9.

Thus, the endpoint device 102(1) has evaluated pixel 1 and pixel 2 over each time instance "t" (every second) over the time period "s" (ten seconds). The endpoint device 102(1) has assigned foreground history values for pixel 1 and pixel 2 at each of these time instances. The endpoint device 102(1) can use this foreground history value data to determine a motion gradient vector of the video stream. That is, by evaluating the foreground history value data for each pixel, the endpoint device 102(1) can determine that the participant made a particular motion at time t=3, and the direction of the motion can be determined by comparing the foreground history values for each pixel. For example, if over a given time period, the foreground history value of pixel 2 increases above the foreground history value for pixel 1 (as in FIG. 3), the motion gradient vector may indicate a motion direction from pixel location $(x_1, y_1)$ for pixel 1 to pixel location $(x_2, y_2)$ for pixel 2. Likewise, if over a given time period, the foreground history value of pixel 1 increases above the foreground history value for pixel 2, the motion gradient vector may indicate a motion direction from pixel location $(x_2, y_2)$ to pixel location $(x_1, y_1)$. The motion gradient vector for the arm movement depicted in FIG. 3 is represented by reference numeral 312 in FIG. 3.

As stated above, the foreground history value can be determined for a plurality of pixels in the video data 302. The foreground history results for these pixels can be used to form a grayscale image that has the same dimensions as the video data 302. By convolving the grayscale image with edge-detection kernels (e.g., using Sobel kernels), the endpoint device 102(1) obtains a motion gradient vector for each pixel in the image. The summation of motion gradient vectors within a detected object (e.g., the pixels of body regions of the participant 108) provides a global direction vector of the object. The endpoint device 102(1) then matches this global direction vector with expected patterns using pre-defined decision criteria. For detecting a "hand raise" gesture, for example, the global direction vector of the arm or hand of the participant 108 may be evaluated to see whether or not the gradient is within, e.g., 30 degrees of the vertical axis in the upward direction. In one example, the motion gradient vectors themselves can be used for this evaluation. A confidence score can then be assigned to the global direction vector and/or the motion gradient vector to determine whether the "hand raise" gesture was intended by the participant 108.

Figure 4:
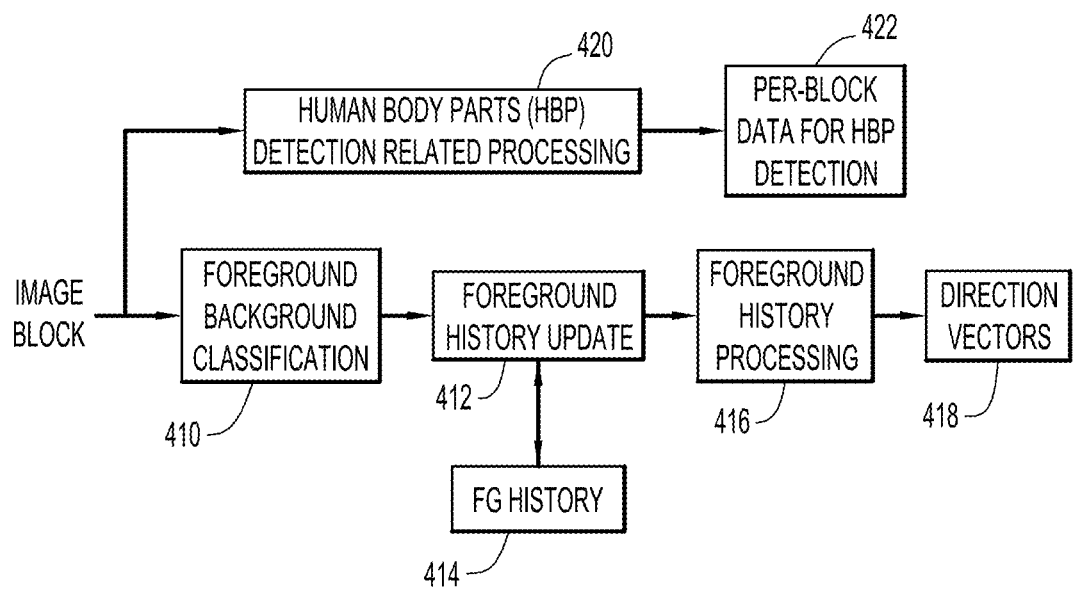
FIG. 4 is an example flow diagram to generate a motion gradient vector for pixels in video data.

Reference is now made to FIG. 4. FIG. 4 shows an example flow diagram depicting operations performed by the endpoint device 102(1) to generate a motion gradient vector for one or more pixels in a video data images. For a given image block of the video data, one or more pixels in the image block undergo a foreground/background classification, as shown in operation 410. After the classification, at operation 412, the foreground history of the pixels is updated by the foreground history logic represented by operation 414. The foreground history is then processed at operation 416, and direction vectors (e.g., motion gradient vectors) are generated at operation 418 for each of the pixels. Also, for a given image block, while the motion gradient vectors are generated, human body parts (HBP) detection related processing is performed, at 420, on each of the pixels in order to identify a specific body part or region of the participant that the pixel represents (if any). At operation 422, the data for the HBP detection is stored.

Figure 5:
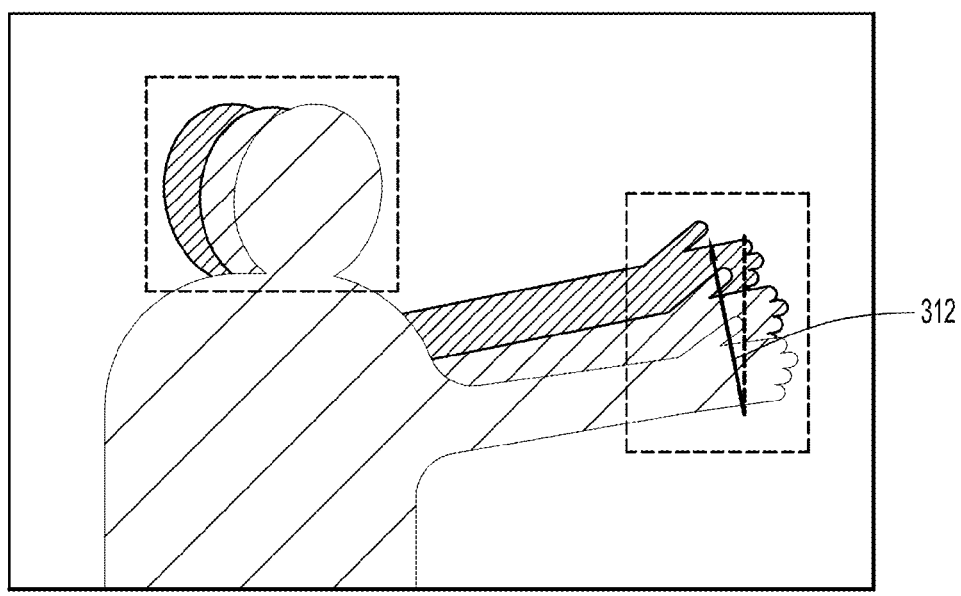
FIG. 5 shows an example of a grayscale image formed from the foreground history data.

Reference is now made to FIG. 5 that shows an example grayscale image 500 formed from the foreground history data. As stated above, the foreground history results for each of the pixels can be used to generate or form a grayscale image. FIG. 5 shows the grayscale image of the participant 108 along with the motion gradient vector 312 representing the arm raising motion performed by the participant. As described above, if the motion gradient vector 312 is within, e.g., 30 degrees of the vertical axis in the upward direction, the endpoint device 102(1) may detect the motion as corresponding to the "hand raise" gesture.

In another example, a "stand up" gesture may be performed by the participant 108. In this example, the HBP detection techniques may be used to initially classify torso pixels of the participant 108 as foreground pixels and that remain classified as foreground pixels for the duration of the time period "s." In other words, in the "stand up" gesture, torso pixels may always have a foreground classification with a foreground history value indicative of the initial classification as a foreground pixel. As the participant stands up, pixels previously identified as background pixels will be identified as new foreground pixels (e.g., the participant's upper body moving into the background region), and thus, a motion vector can be generated from the foreground history values of the torso pixels already classified as foreground pixels and the upper body pixels newly classified as foreground pixels.

Figure 6:
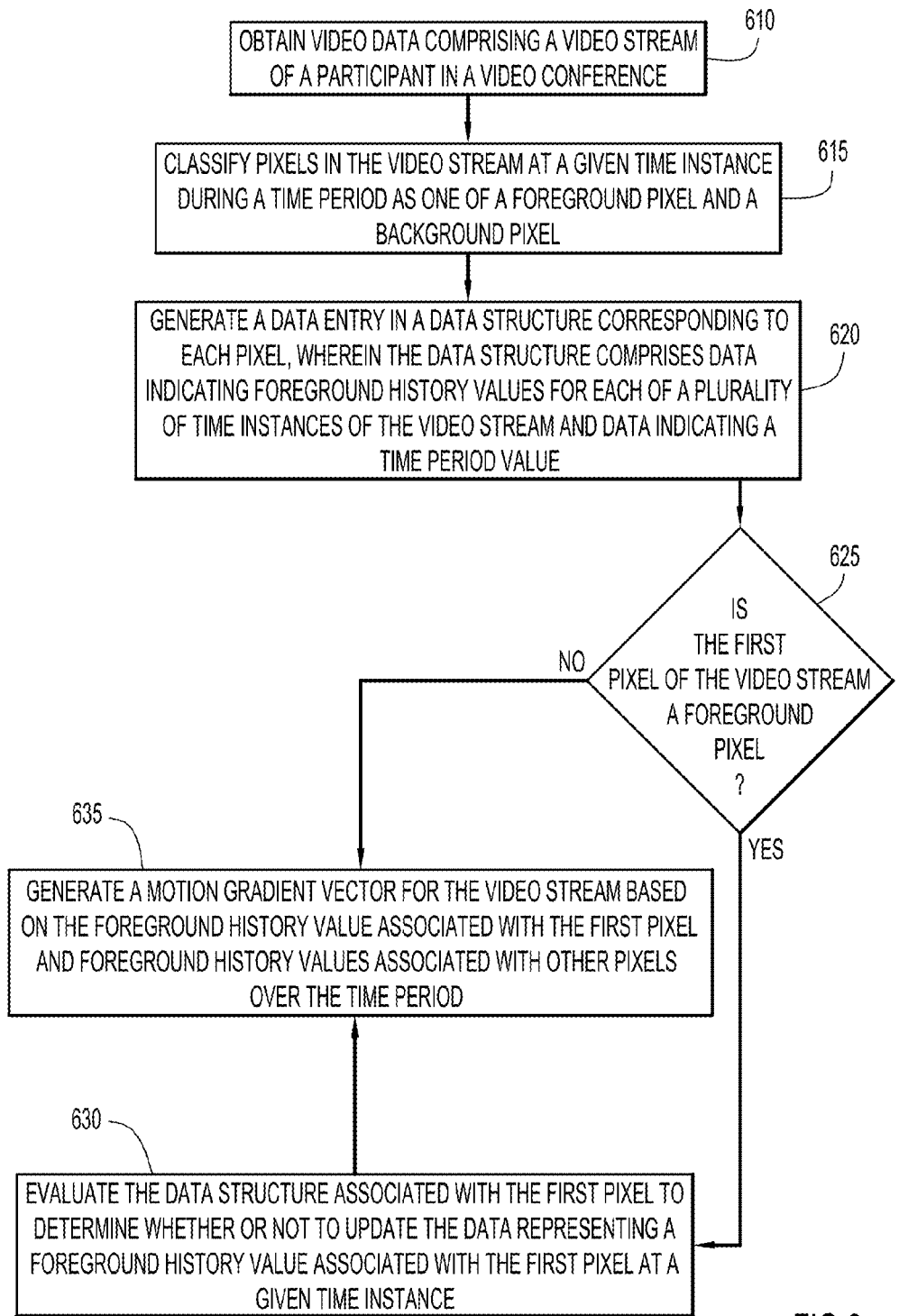
FIG. 6 shows an example flow chart depicting operations of the gesture detection process logic to detect the gesture.

Reference is now made to FIG. 6. FIG. 6 shows an example flow chart depicting operations of the gesture detection process logic 212 to generate the motion gradient vector and to detect the gesture. At operation 610, the endpoint device 102(1) obtains video data comprising a video stream of a person, e.g., a participant in a video conference. Pixels in the video stream are classified, at 615, at a given time instance during a time period as one of a foreground pixel and a background pixel. At operation 620, a data entry is generated in a data structure corresponding to each pixel. The data structure comprises data indicating foreground history values for each of a plurality of time instances of the video stream and data indicating a time period value. At operation 625, a determination is made as to whether the first pixel of the video stream is a foreground pixel. If so, at operation 630, the data structure associated with the first pixel is evaluated to determine whether or not to update the data representing a foreground history value associated with the first pixel at a given time instance. A motion gradient vector is then generated, at operation 635, for the video stream based on the foreground history value associated with the first pixel and the foreground history values associated with other pixels over the time period. If the first pixel of the video stream is not a foreground pixel (i.e., if the answer to decision 625 is "no"), the process goes to operation 635.

It should be appreciated that the techniques described above in connection with all embodiments may be performed by one or more computer readable storage media that is encoded with software comprising computer executable instructions to perform the methods and steps described herein. For example, the operations performed by the endpoint device 102(1), video conference bridge 104 or other network devices may be performed by one or more computer or machine readable storage media (non-transitory) or device executed by a processor and comprising software, hardware or a combination of software and hardware to perform the techniques described herein.

In sum, a method is provided comprising: obtaining video data comprising a video stream of a person; classifying pixels in the video stream at a given time instance during a time period as one of a foreground pixel and a background pixel; generating a data entry in a data structure corresponding to each pixel, wherein the data structure comprises data indicating foreground history values for each of a plurality of time instances of the video stream and data indicating a time period value; when classifying indicates that a first pixel of the video stream is a foreground pixel, evaluating the data structure associated with the first pixel to determine whether or not to update the data representing a foreground history value associated with the first pixel at the given time instance; generating a motion gradient vector for the video stream based on the foreground history value associated with the first pixel and foreground history values associated with other pixels over the time period.

In addition, one or more computer readable storage media encoded with software is provided comprising computer executable instructions and when the software is executed operable to: obtain video data comprising a video stream of a person; classify pixels in the video stream at a given time instance during a time period as one of a foreground pixel and a background pixel; generate a data entry in a data structure corresponding to each pixel, wherein the data structure comprises data indicating foreground history values for each of a plurality of time instances of the video stream and data indicating a time period value; when a first pixel of the video stream is a foreground pixel, evaluate the data structure associated with the first pixel to determine whether or not to update the data representing a foreground history value associated with the first pixel at the given time instance; and generate a motion gradient vector for the video stream based on the foreground history value associated with the first pixel and foreground history values associated with other pixels over the time period.

Furthermore, an apparatus is provided comprising: a network interface unit; a memory; and a processor coupled to the network interface unit and the memory and configured to: obtain video data comprising a video stream of a person; classify pixels in the video stream at a given time instance during a time period as one of a foreground pixel and a background pixel; generate a data entry in a data structure corresponding to each pixel, wherein the data structure comprises data indicating foreground history values for each of a plurality of time instances of the video stream and data indicating a time period value; when a first pixel of the video stream is a foreground pixel, evaluate the data structure associated with the first pixel to determine whether or not to update the data representing a foreground history value associated with the first pixel at the given time instance; and generate a motion gradient vector for the video stream based on the foreground history value associated with the first pixel and foreground history values associated with other pixels over the time period.

The above description is intended by way of example only. Various modifications and structural changes may be made therein without departing from the scope of the concepts described herein and within the scope and range of equivalents of the claims.

What is claimed is:

1. A method comprising:
    obtaining video data comprising a video stream of a person;
    classifying a first pixel in the video stream at an initial time instance of a time period as one of a foreground pixel or a background pixel;
    initializing a foreground history value associated with the first pixel to zero for the initial time instance;
    reclassifying the first pixel at each time instance subsequent to the beginning time instance in the time period as one of a foreground pixel or a background pixel;
    when reclassification indicates that the first pixel at a first time instance is a foreground pixel, setting the foreground history value associated with the first pixel to a non-zero value related to the first time instance;
    maintaining the foreground history value associated with the first pixel to the non-zero value related to the first time instance for a pre-determined time period;

resetting the foreground history value to zero at a second time instance after the pre-determined time period expires; and generating a motion gradient vector for the video stream based on the foreground history value associated with the first pixel and foreground history values associated with other pixels over the time period.

2. The method of claim 1, further comprising dividing the video data into one or more video data regions and performing the classifying, generating the data entry and evaluating operations on pixels in each of the video data regions.

3. The method of claim 1, further comprising categorizing each pixel that is designated as a foreground pixel into one or more foreground groups.

4. The method of claim 3, further comprising:
generating an expected gradient vector for each pixel based on the categorizing; and
comparing the expected gradient vector to the motion gradient vector to obtain a movement determination for the foreground group.

5. The method of claim 1, further comprising:
interpreting the motion gradient vector as being associated with a predetermined gesture intended by the person; and
executing an electronic operation associated with the pre-determined gesture intended by the person.

6. The method of claim 1, wherein generating the motion gradient vector comprises generating a grayscale image of foreground pixels in the time period.

7. The method of claim 6, wherein generating the motion gradient vector comprises convolving the grayscale image with a predetermined edge-detection kernel.

8. One or more non-transitory computer readable storage media encoded with software comprising computer executable instructions and when the software is executed, the software is operable to:
obtain video data comprising a video stream of a person;
classify a first pixel in the video stream at an initial time instance of a time period as one of a foreground pixel or a background pixel;
initialize a foreground history value associated with the first pixel to zero for the initial time instance;
reclassify the first pixel at each time instance subsequent to the beginning time instance in the time period as one of a foreground pixel or a background pixel;
when reclassification indicates that the first pixel at a first time instance is a foreground pixel, set the foreground history value associated with the first pixel to a non-zero value related to the first time instance;
maintain the foreground history value associated with the first pixel to the non-zero value related to the first time instance for a pre-determined time period;
reset the foreground history value to zero at a second time instance after the pre-determined time period expires; and
generate a motion gradient vector for the video stream based on the foreground history value associated with the first pixel and foreground history values associated with other pixels over the time period.

9. The computer readable storage media of claim 8, further comprising instructions operable to divide the video data into one or more video data regions and performing the classify operation, generate the data entry operation and evaluate operations on pixels in each of the video data regions.

10. The computer readable storage media of claim 8, further comprising instructions operable to categorize each pixel that is designated as a foreground pixel into one or more foreground groups.

11. The computer readable storage media of claim 10, further comprising instructions operable to:
generate an expected gradient vector for each pixel based on the categorize operation; and
compare the expected gradient vector to the motion gradient vector to obtain a movement determination for the foreground group.

12. The computer readable storage media of claim 8, further comprising instructions operable to:
interpret the motion gradient vector as being associated with a predetermined gesture intended by the person; and
execute an electronic operation associated with the pre-determined gesture intended by the person.

13. The computer readable storage media of claim 8, wherein the instructions operable to generate the motion gradient vector comprise instructions operable to generate a grayscale image with a predetermined edge-detection kernel.

14. The computer readable storage media of claim 13, wherein the instructions operable to generate the motion gradient vector comprise instructions operable to convolve the grayscale image with a predetermined edge-detection kernel.

15. An apparatus comprising:
a network interface unit;
a memory; and
a processor coupled to the network interface unit and the memory and configured to:
obtain video data comprising a video stream of a person;
classify a first pixel in the video stream at an initial time instance of a time period as one of a foreground pixel or a background pixel;
initialize a foreground history value associated with the first pixel to zero for the initial time instance;
reclassify the first pixel at each time instance subsequent to the beginning time instance in the time period as one of a foreground pixel or a background pixel;
when reclassification indicates that the first pixel at a first time instance is a foreground pixel, set the foreground history value associated with the first pixel to a non-zero value related to the first time instance;
maintain the foreground history value associated with the first pixel to the non-zero value related to the first time instance for a pre-determined time period;
reset the foreground history value to zero at a second time instance after the pre-determined time period expires; and
generate a motion gradient vector for the video stream based on the foreground history value associated with the first pixel and foreground history values associated with other pixels over the time period.

16. The apparatus of claim 15, wherein the processor is further configured to divide the video data into one or more video data regions and to perform the classify, generate the data entry and evaluate operations on pixels in each of the video data regions.

17. The apparatus of claim 15, wherein the processor is further configured to categorize each pixel that is designated as a foreground pixel into one or more foreground groups.

18. The apparatus of claim 17, wherein the processor is further configured to:
generate an expected gradient vector for each pixel based on the categorize operation; and compare the expected gradient vector to the motion gradient vector to obtain a movement determination for the foreground group.

19. The apparatus of claim 15, wherein the processor is further configured to:
   interpret the motion gradient vector as being associated with a predetermined gesture intended by the person; and
   execute an electronic operation associated with the predetermined gesture intended by the person.

20. The apparatus of claim 15, wherein the processor is further configured to generate a grayscale image of foreground pixels in the time period.

21. The apparatus of claim 20, wherein the processor is further configured to convolve the grayscale image with a predetermined edge-detection kernel.

22. The method of claim 5, further comprising:
   evaluating the motion gradient vector with respect to each of a plurality of predetermined gestures, to produce a confidence value for each of the plurality of predetermined gestures; and
   selecting one of the plurality of predetermined gestures as the predetermined gesture intended by the person, wherein the predetermined gesture intended by the person is associated with a highest confidence value from among the plurality of predetermined gestures.

23. The computer readable storage media of claim 12, further comprising instructions operable to:
   evaluate the motion gradient vector with respect to each of a plurality of predetermined gestures, to produce a confidence value for each of the plurality of predetermined gestures; and
   select one of the plurality of predetermined gestures as the predetermined gesture intended by the person, wherein the predetermined gesture intended by the person is associated with a highest confidence value from among the plurality of predetermined gestures.

24. The apparatus of claim 19, wherein the processor is further configured to:
   evaluate the motion gradient vector with respect to each of a plurality of predetermined gestures, to produce a confidence value for each of the plurality of predetermined gestures; and
   select one of the plurality of predetermined gestures as the predetermined gesture intended by the person, wherein the predetermined gesture intended by the person is associated with a highest confidence value from among the plurality of predetermined gestures.

* * * * *